A. BEEMAN.

Improvement in Milk-Coolers.

No. 127,952.

Patented June 18, 1872.

WITNESSES:
A. B. Richmond
Roi Reisinger

INVENTOR:
Noah Beeman

UNITED STATES PATENT OFFICE.

ALVAH BEEMAN, OF POTTER'S CORNERS, PENNSYLVANIA, ASSIGNOR TO H. CLAY BEEMAN.

IMPROVEMENT IN MILK-COOLERS.

Specification forming part of Letters Patent No. 127,952, dated June 18, 1872.

*To all whom it may concern:*

Be it known that I, ALVAH BEEMAN, of Potter's Corners, in the county of Crawford, State of Pennsylvania, have invented a new and Improved Milk-Cooler; and I do hereby declare that the following is a full and exact description of the same, reference being had to the accompanying drawing and the letters of reference marked thereon.

The nature and object of my invention is to combine a milk-cooler and strainer, so constructed that as the milk passes through them it will be cooled down to the proper degree of temperature to prevent fermentation and souring.

Figure 3:
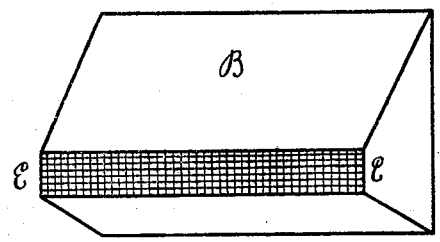
Figure 2:
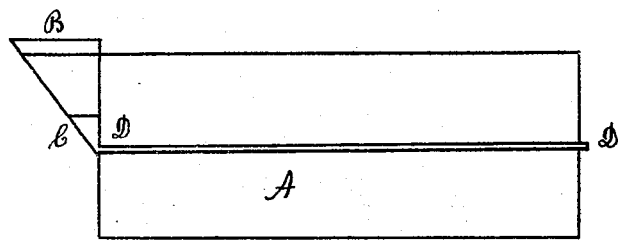
Figure 1:
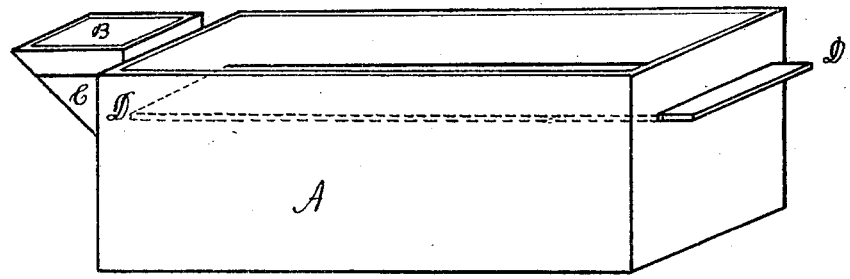

A is a box of wood or metal, made of any desired size, according to the amount of milk to be cooled. This box is filled with cold water, and ice if desired. C is a triangular-shaped "hopper" or box on the end of the tank A, with an opening in the bottom connected with a broad flat thin tube, D D, which passes lengthwise through the center of the tank A, and is surrounded by ice and water. The broad surface of the tube exposed to the cold, and the thinness of the stream of milk exposes so much surface to the cold that the milk is cooled to the desired temperature in its passage through the tube D D. Figure 2 is a sectional view of the cooler, showing the position of the tube. B is a strainer, which is placed in the "hopper" C, and can be removed at pleasure for the purpose of cleaning. Fig. 3 shows the strainer removed from the hopper C, E E being the bottom, which is of gauze-wire.

I am aware that devices for cooling milk by means of passing it through coiled tubes inclosed in coolers have before been used; but, owing to the susceptibility of milk, and the impossibility of cleaning such devices so as to keep them sweet by the mere passage of water through them, such devices have been found to sour the milk passed through them, and I do not claim such as my invention.

What I claim is—

The wide rectangular tube or duct D having the hopper C, operating, in combination with the removable strainer B and cooler A, for the purpose specified.

ALVAH BEEMAN.

Witnesses:
   A. B. RICHMOND,
   ROE REISINGER.